United States Patent [19]
Jockel et al.

[11] 3,963,642
[45] June 15, 1976

[54] PROCESS FOR PRODUCING A REDUCING GAS

[75] Inventors: Heinz Jockel, Kelin-Gerau; Hans-Joachim Renner, Neider-Erlenbach, both of Germany

[73] Assignee: Metallgesellschaft Aktiengesellschaft, Frankfurt am Main, Germany

[22] Filed: July 25, 1974

[21] Appl. No.: 491,896

Related U.S. Application Data

[63] Continuation of Ser. No. 278,672, Aug. 7, 1972, abandoned.

[30] Foreign Application Priority Data

Aug. 20, 1974    Germany............................ 2141875

[52] U.S. Cl.............................. 252/373; 48/196 R; 48/214 A
[51] Int. Cl.²......................................... C01B 2/16
[58] Field of Search................ 252/373; 48/214, 196

[56] References Cited
UNITED STATES PATENTS

| | | | |
|---|---|---|---|
| 2,056,911 | 10/1936 | Schiller et al. | 252/373 UX |
| 2,284,603 | 5/1942 | Belchetz et al. | 252/373 X |
| 2,585,737 | 2/1952 | Carpenter | 252/373 |
| 2,828,196 | 3/1958 | Glover et al. | 252/373 UX |
| 2,868,632 | 1/1959 | Milbourne | 252/373 X |
| 3,417,029 | 12/1968 | McMahon | 423/651 |
| 3,441,395 | 4/1969 | Dent | 252/373 |
| 3,459,520 | 8/1909 | Percival | 252/373 UX |

FOREIGN PATENTS OR APPLICATIONS

| | | | |
|---|---|---|---|
| 272,684 | 9/1964 | Australia | 252/373 |
| 42-15376 | 8/1967 | Japan | 252/373 |
| 1,196,038 | 1/1970 | United Kingdom | 252/373 |
| 1,132,776 | 11/1968 | United Kingdom | 252/373 |
| 820,257 | 9/1959 | United Kingdom | 252/373 |
| 1,150,437 | 4/1969 | United Kingdom | 252/373 |

*Primary Examiner*—Howard T. Mars
*Attorney, Agent, or Firm*—Burgess, Dinklage & Sprung

[57] ABSTRACT

A reducing gas useful for reducing ores containing carbon monoxide and hydrogen and low amounts of carbon dioxide and water vapor is produced by reacting gaseous and/or volatile liquid hydrocarbons with water vapor on an indirectly heated, nickel-containing catalyst under superatmospheric pressure. A partial amount of the hydrocarbons to be reacted is first cracked in contact with a nickel catalyst at 350° – 500°C. with at least part of the water vapor to form a hydrogen-containing gas, which is mixed with the remaining hydrocarbons. The mixture is further heated if desired and is then completely reacted at temperatures above 900°C. in contact with the indirectly heated catalyst.

3 Claims, 1 Drawing Figure

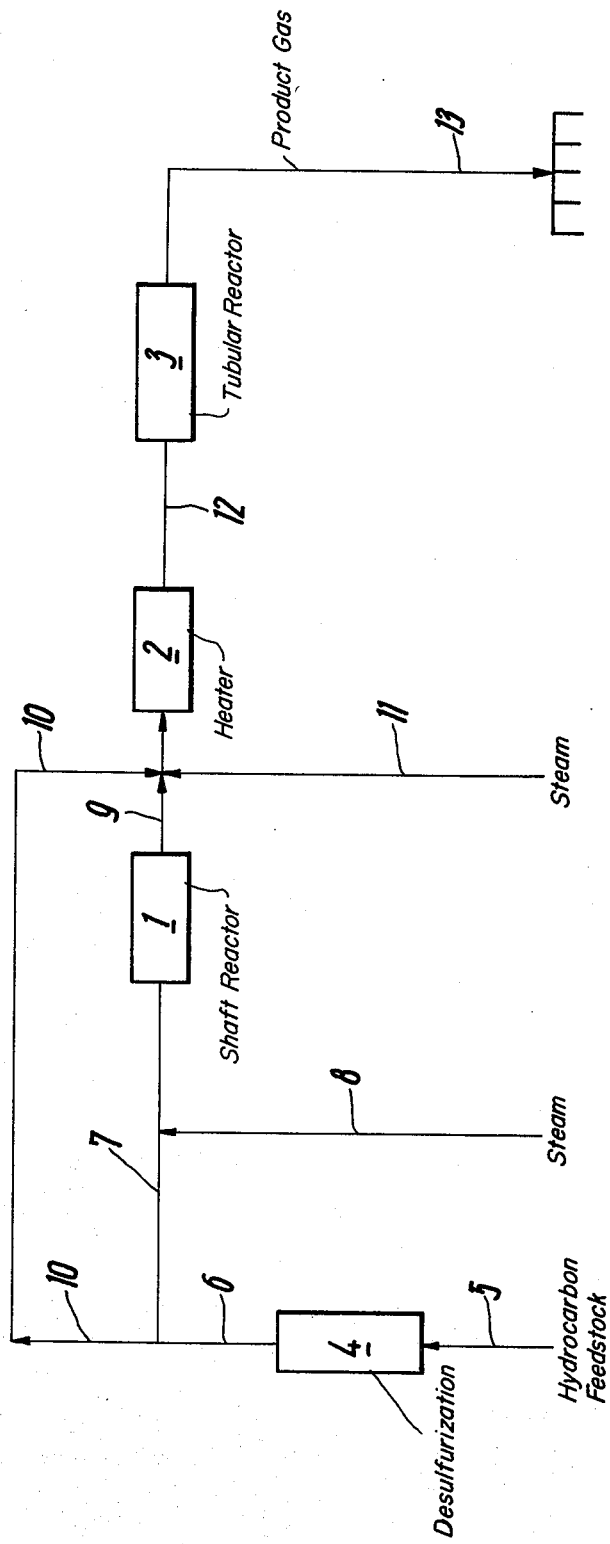

PROCESS FOR PRODUCING A REDUCING GAS

This is a continuation, of application Ser. No. 278,672, filed Aug. 7, 1972 and now abandoned.

BACKGROUND

This invention relates to a process for producing a reducing gas which can be used for reducing ores. The reducing gas contains carbon monoxide and hydrogen and low amounts of carbon dioxide and water vapor.

In the iron- and steel-producing industries, it has often been difficult for years to provide adequate quantities of coke in the qualities required for the operation of blast furnaces. The bottlenecks to be overcome may be due to an inadequate coking plant capacity or to a lack of cokable coal.

Methods enabling a decrease of the consumption of coke in the blast furnace have been known for years. These methods comprise, e.g., an increase of the temperature and/or oxygen content of the blast furnace blast, the blowing of fuel oil into the blast furnace, or the increase of the pressure in the lower part of the blast furnace. More recently, direct reducing processes have been developed with the object substantially to avoid a consumption of coke in the reduction of ore and to reduce the ore mainly or exclusively by reducing gases.

Such reducing gas should have high CO and $H_2$ contents whereas its contents of water vapor and $CO_2$ should be minimized and its methane content should be low. Finally, such reducing gas should be as hot as possible.

It is known to convert gaseous and even liquid hydrocarbons, even of fuel oil grade, into a gas having high CO and $H_2$ contents by a gasification with the aid of pure oxygen. The non-catalytic, thermal process is exothermic so that sulfur-containing fuel may be used. The method has the disadvantage that an excess of oxygen must be used in order to attain the high temperatures required for complete cracking of the feed hydrocarbons. Because of the surplus of oxygen, the product gas has a higher $CO_2$ content, which is detrimental in a reducing gas.

It is known to effect this partial oxygenation of hydrocarbons in two stages and to carry out a catalytic process in the second stage, if desired. DAS 1,226,545 describes a process of producing a gas which is made from hydrocarbons and which is suitable as a reducing gas and contains mainly CO and $H_2$, whereas it has a low $CO_2$ content. In that process the C : O ratio in the mixed feedstocks consisting of hydrocarbons and oxygen and/or air is adjusted almost to 1 and the reaction is carried out in two stages. The first reaction stage is carried out in a swirl chamber, to which at least one component is admitted at high speed. The second stage is carried out in a catalyst-free, hot-blast stove (cowper stove), which is heated to about 1300°C.

It is also known to produce gases having high CO and $H_2$ contents by cracking hydrocarbons with water vapor in contact with indirectly heated catalysts containing nickel on a refractory carrier material at temperatures above 750°C. This process is widely used to produce synthesis gas and has the advantage of requiring no pure oxygen. On the other hand, it depends on sulfur-free feedstocks and is restricted to the processing of gaseous or readily evaporable liquid hydrocarbons of the gasoline and naphtha ranges.

When used for the production of a reducing gas, this process has the further disadvantage that the hydrocarbons must be reacted in the presence of an excess of water vapor in order to suppress the Boudouard reaction, which would result in a formation of elementary carbon, which is deposited on the catalyst and may finally clog the catalyst layer and the pipelines.

The low contents of $CO_2$ and $CH_4$ desired in a reducing gas can be attained in this process by the use of high final cracking temperatures, which may be above 1000°C. The most important difficulties arising in a process where a reducing gas is produced by reforming hydrocarbons with steam involve a decrease of the amount of water vapor required for the reaction and the suppression of the formation of carbon black.

These difficulties may be avoided by some measures which have been used in practice.

The hydrocarbon and water vapor feedstocks may be preheated to higher temperatures individually or in a mixture. Preheating temperatures of 400°–450°C. are used in the production of synthesis gases. A higher preheating up to about 600°C. can be carried out only in a heater made from special high-alloy material, which are otherwise required only in the tubular reactor itself.

In another process, part of the water vapor required for the reaction is replaced by carbon dioxide, which is recovered from the product gas by scrubbing and is returned to the reforming process carried out with steam. In this case too, a preheating to high temperatures, up to about 800°C., is required. It is also known to use catalysts having different activities in the tubular heater in such a manner that the tubes contain a low-activity catalyst at their inlet end so that at that end the heating of the reaction mixture predominates over the actual reaction. In this way, the development of dangerously high CO concentrations is avoided particularly at the beginning of the reaction. Depending on the composition of the catalyst and particularly of its support, slight amounts of carbon black may be deposited in the inlet zones of the reactor tubes but these are not sufficient to clog the flow paths.

At its inlet end, the catalyst layer may comprise alkali-containing catalysts, which are effective at extremely low steam-carbon ratios. Although carbon black is deposited on such catalysts, the deposited carbon is consumed by accompanying reactions so that carbon black is not deposited in large amounts. These nickel-containing catalysts which comprise a support and which in most cases are alkalinized by an addition of potassium carbonate are sensitive to elevated temperatures. Their alkali content is volatile at temperatures much in excess of 850°C. As the operation proceeds, the alkali content of the catalyst is progressively lost so that its activity changes constantly and the formation of carbon black is increasingly promoted. The volatilized alkali compounds are deposited on colder parts of the plant, where they give rise to clogging and corrosion. Catalysts of this kind are described for example in USP-Specification No. 3 417 029.

Even in combination, these known measures do not enable a reaction of hydrocarbons and water vapor under conditions which are sufficiently remote from the carbon black limit and with formation of a product gas in which the water vapor content is minimized and which can be directly used as a hot reducing gas without having to be cooled substantially below the temperature at which it is formed.

SUMMARY

It has now been found that a tubular reactor can be operated to react gaseous and/or volatile hydrocarbons with water vapor in contact with an indirectly heated catalyst to produce a reducing gas without the formation of carbon black and with a very low water vapor-carbon ratio if part of the hydrocarbon feedstock is first reacted at 350°–550°C. in contact with a high-activity nickel catalyst in known manner with at least part of the water vapor required for the reaction. The resulting hydrogen-containing gas together with the remaining hydrocarbons and any additional water vapor is then introduced into the tubular reactor and is reacted therein at temperatures above 900°C. and at an conventional alumina supported nickel catalyst.

The preparation of reducing gas from a gaseous feedstock, i.e., natural gas is demonstrated by the examples herein. The overall reaction is carried out under a pressure of 5 to 15 kilograms per square centimeter. The reaction in the presence of the indirectly heated nickel containing catalyst is maintained at a temperature of 975-1100°C.

DESCRIPTION

It is known that low-boiling liquid hydrocarbons can be cracked with water vapor in contact with high-nickel catalysts having supports which comprise alumina or aluminum silicate or magnesium silicate or mixtures thereof, to form high-methane gases, which also contain carbon monoxide, carbon dioxide, and hydrogen. Such processes are described for example in the British Patent Specifications 820 257 and 1 132 776. It will depend on the temperature conditions of the reaction whether the methane or the carbon oxides and hydrogen predominate in the product gas. By this reaction, natural gas can also be converted in part into carbon oxides and hydrogen.

If the tubular reactor 3 is fed with hydrogen and carbon dioxide from shaft reactor 1 via line 9 together with the hydrocarbons to be cracked via line 10 and the water vapor, the reaction will be carried out under conditions sufficiently remote from the carbon black limit even if the water vapor-carbon ratio is low in the range from 1,5 : 1 to 1:1 so that a product gas can be obtained which contains only very little water vapor.

The contents of hydrogen and carbon dioxide in the mixed feedstock for the tubular reactor allow the presence of higher gaseous or vaporous hydrocarbons in the mixed feedstock. In one embodiment of the invention, a rich gas produced by a cracking of light hydrocarbons with water vapor is added to the mixed feedstock consisting of natural gas and water vapor and fed to the tubular reactor.

The drawing is a flow diagram showing by way of example a plant for carrying out the process according to the invention.

The plant includes a shaft reactor 1, a heater 2 and a tubular reactor 3. As is conventional in catalytic processes of cracking hydrocarbons, the hydrocarbons to be processed are treated in a desulfurizing stage 4 for the sake of precaution.

The desulfurizer 4 receives the hydrocarbon feedstock through a conduit 5 and discharges the feedstock through a conduit 6. A partial stream of the feedstock is conducted in a conduit 7 to the shaft reactor 1. Water vapor from a conduit 8 is added to the hydrocarbons before they enter the shaft reactor. Hydrocarbons and water vapor are preheated in heat exchangers which are not shown.

The shaft reactor 1 contains a highly active nickel catalyst containing 10 to 50% (weight) of nickel on a support of magnesium silicate. In this reactor, part of the hydrocarbons supplied to it are cracked to form carbon dioxide and hydrogen without a formation of substantial amounts of carbon monoxide if the reaction temperature is held at 400° – 450°C. The other partial stream of the hydrocarbon feedstock is added from a conduit 10 and, if desired, additional water vapor is added from a conduit 11 to the gas which leaves the shaft reactor through a conduit 9. This mixture is heated in the heater 2 to 450° – 550°C. and is then passed through a conduit 12 into the tubular reactor 3 and is completely reacted in contact with the conventional alumina supported nickel catalyst contained in the reactor 3. This catalyst is kept at a temperature above 900°C. by indirect heating. The hot product gas has low water vapor and carbon dioxide contents and may be directly introduced into the reducing process through a pipe system 13, which is suitably lined with refractory.

The following example further illustrates the invention:

EXAMPLE 1

In this example, a natural gas containing 90% by volume of methane and 10% by volume of nitrogen is cracked with water vapor. In the control, the reaction is carried out in the conventional manner in a tubular heater in contact with a conventional alumina supported nickel catalyst which is kept at a high temperature by indirect heating. In the other experiment, the gas is processed in two stages in accordance with the invention where part of the natural gas feedstock is reacted in the shaft reactor in a preliminary reaction with the entire amount of water vapor required, whereby a high-hydrogen gas is formed, which together with the balance of the natural gas is reacted in the tubular heater in contact with said indirectly heated catalyst.

CONTROL EXPERIMENT a. Natural gas having the above-mentioned composition, at a rate of 1 standard cubic meter per hour, and water vapor at a rate of 1.17 standard cubic meters per hour are reacted under a pressure of 10 kilograms per square centimeter in an externally heated, pressure-resisting reaction vessel, which contains 1 liter of catalyst. The catalyst contains 20% by weight nickel on an alumina support. The preheated mixed feedstock consisting of natural gas and water vapor is at 500°C. when it enters the reaction vessel. The reaction vessel is externally heated to maintain the outlet temperature of the product gas at 1050°C. At a rate of 3.72 standard cubic meters per hour, a product gas is obtained having the following composition on a dry basis:

COMPOSITION OF PRODUCT GAS FROM REACTOR 3

| | |
|---|---|
| $CO_2$ | 1.0% by volume |
| $CO$ | 23.0% by volume |
| $H_2$ | 73.1% by volume |
| $CH_4$ | 0.2% by volume |
| $N_2$ | 2.7% by volume |

The gas contains 6.4% (vol) water vapor. After an operation for 28 hours, carbon (carbon black) is detected in the product gas. Soon thereafter, the pressure decreases progressively so that the plant must be shut down. The catalyst layer has become almost impermeable to gas owing to the deposition of carbon black.

THE INVENTION b. The externally heated reaction vessel is now preceded by a shaft reactor 1 which contains a high-activity nickel catalyst having a large surface area and a nickel content of 45% by weight on a support of magnesium silicate. The amount of catalyst in this reactor amounts to 0.3 liter.

In this two-stage arrangement, natural gas at a rate of 1 standard cubic meter per hour and water vapor at a rate of 1.17 standard cubic meters per hour are also processed but the preceding reactor is fed only with 0.5 standard cubic meters of natural gas per hour and with water vapor at the full rate of 1.17 standard cubic meters per hour after a preheating to 450°C. In the reactor, a gas having the following composition (on a dry basis)

COMPOSITION OF GAS FROM SHAFT REACTOR 1

| | |
|---|---|
| $CH_4$ | 67.1% by volume |
| $H_2$ | 19.9% by volume |
| $CO_2$ | 5.0% by volume |
| $N_2$ | 8.0% by volume | is formed at a rate of 0.625 standard cubic meter per hour. The CO content is below 1% by volume. The gas also contains 1.11 standard cubic meters water vapor per cubic meter. The remaining natural gas at a rate of 0.5 standard cubic meters per hour is added to this gas. The mixture is heated in the heater (2) and supplied into the externally heated reaction vessel. The heating is again adjusted to provide a product gas at a temperature of 1050°C.

The composition of that product gas does not substantially differ from the gas which has been produced in the heated reaction vessel (tubular heater) alone in experiment a).

It was possible to operate the indirectly heated reactor for a prolonged time without trouble and without a change in pressure drop. After a satisfactory trial run for 500 hours, no deposition of carbon was found on the catalysts in both reactors.

What is claimed is:

1. In a process for producing a reducing gas containing carbon monoxide and hydrogen and low amounts of carbon dioxide and water vapor wherein natural gas is reacted with water vapor under super-atmospheric pressures of 5 to 15 kilograms per square centimeter, the improvement which comprises
   a. first reacting a partial amount of the natural gas feedstock with at least part of the water vapor to be used at temperatures of 350°–500°C in a shaft reaction zone in the presence of a high-nickel catalyst containing 10–50% by weight nickel on a magnesium silicate support to form a gas containing hydrogen and methane;
   b. mixing said gas containing hydrogen and methane with the remaining amount of natural gas feedstock and any remaining amount of water vapor to be used, the overall ratio of water vapor to natural gas for steps (a) and (b) being in the range of 1.5:1 to 1:1; and
   c. reacting said mixture at temperatures of 975°–1000°C in a tubular reaction zone in the presence of an indirectly heated nickel-containing catalyst on an alumina support thereby producing said reducing gas.

2. Process of claim 1 wherein part of the water vapor to be used is used for cracking said partial amount of the natural gas feedstock and the remaining part of the water vapor to be used is mixed with said gas containing hydrogen and methane and the remaining amount of natural gas feedstock before carrying out the reaction in said tubular reaction zone.

3. Process of claim 1 wherein all of the water vapor to be used is added in step (a).

* * * * *

UNITED STATES PATENT AND TRADEMARK OFFICE
CERTIFICATE OF CORRECTION

PATENT NO. : 3,963,642
DATED : June 15, 1976
INVENTOR(S) : Heinz Jockel and Hans-Joachim Renner It is certified that error appears in the above-identified patent and that said Letters Patent are hereby corrected as shown below:

[75] Inventors: HEINZ JOCKEL, Kelin-Gerau;
HANS-JOACHIM RENNER,
Neider-Erlenbach, both of Germany should read:

Inventors: HEINZ JOCKEL, Klein-Gerau;
HANS-JOACHIM RENNER,
Nieder-Erlenbach, both of Germany Signed and Sealed this Fourteenth Day of December 1976

[SEAL]

Attest:

RUTH C. MASON
*Attesting Officer*

C. MARSHALL DANN
*Commissioner of Patents and Trademarks*